United States Patent
Mintz et al.

(10) Patent No.: US 11,675,616 B2
(45) Date of Patent: Jun. 13, 2023

(54) HOT KEY THROTTLING BY QUERYING AND SKIPPING TASK QUEUE ENTRIES

(71) Applicants: Michael Mintz, San Francisco, CA (US); Thirukumaran Vaseeharan, Brooklyn, NY (US); Aaron Levin, Quebec (CA); David Judd, Oakland, CA (US); Nathaniel Wilson, Vancouver (CA)

(72) Inventors: Michael Mintz, San Francisco, CA (US); Thirukumaran Vaseeharan, Brooklyn, NY (US); Aaron Levin, Quebec (CA); David Judd, Oakland, CA (US); Nathaniel Wilson, Vancouver (CA)

(73) Assignee: STRIPE, INC., South San Francisco, CA (US)

( * ) Notice: Subject to any disclaimer, the term of this patent is extended or adjusted under 35 U.S.C. 154(b) by 184 days.

(21) Appl. No.: 17/097,976

(22) Filed: Nov. 13, 2020

(65) Prior Publication Data

US 2022/0156109 A1 May 19, 2022

(51) Int. Cl.
*G06F 9/48* (2006.01)

(52) U.S. Cl.
CPC .......... *G06F 9/4818* (2013.01); *G06F 9/4881* (2013.01)

(58) Field of Classification Search
CPC ..... G06F 9/4881; G06F 16/903; G06F 9/4818
See application file for complete search history.

(56) References Cited

U.S. PATENT DOCUMENTS

| | | | | |
|---|---|---|---|---|
| 8,745,032 | B1* | 6/2014 | Brown | G06F 16/2453 707/812 |
| 11,182,691 | B1* | 11/2021 | Zhang | G06N 20/00 |
| 2002/0077871 | A1* | 6/2002 | Udelhoven | G06Q 10/02 705/5 |
| 2007/0118653 | A1* | 5/2007 | Bindal | H04L 47/10 709/226 |
| 2010/0229218 | A1* | 9/2010 | Kumbalimutt | G06F 9/5005 726/4 |
| 2016/0139952 | A1* | 5/2016 | Geng | G06F 9/5072 718/103 |
| 2017/0289053 | A1* | 10/2017 | Byelov | H04L 47/25 |
| 2021/0004880 | A1* | 1/2021 | Benkreira | G06Q 20/108 |

\* cited by examiner

*Primary Examiner* — Michael W Ayers
(74) *Attorney, Agent, or Firm* — Womble Bond Dickinson (US) LLP

(57) ABSTRACT

Methods and apparatuses for scheduling tasks with a job scheduler are disclosed. In one embodiment, the method comprises: tracking a number of active tasks for each key of a plurality of keys; writing, by a scheduler, a query to identify a next scheduled task among a plurality of scheduled tasks ordered by time in a task queue, the query having an index that excludes tasks associated with a list of one or more keys of the plurality of keys that have a count of active tasks greater than a first limit associated with each key; querying, by a scheduler, the task queue using the query to identify the next scheduled task among the plurality of scheduled tasks, the next scheduled task being associated with a key not excluded by the query; and executing the next scheduled task.

19 Claims, 6 Drawing Sheets

HOT KEY THROTTLING BY QUERYING AND SKIPPING TASK QUEUE ENTRIES

FIELD OF THE INVENTION

Embodiments of the present invention relate to the field of systems for handling tasks using a job scheduler; more particularly, embodiments of the present invention relate to performing task scheduling in manner that selects certain tasks for execution based on the partitioning (e.g., keys) of a data set upon which tasks are executed.

BACKGROUND OF THE INVENTION

A job scheduler controls the execution of tasks. The tasks may come from a number of computer applications and are stored in a task queue. The job scheduler manages the task queue. As part of managing the task queue, the job scheduler selects tasks for execution. When scheduling, the job scheduler accesses the task queue to select the next task and dispatches that task for execution by processing resources (e.g., a cluster of computers for batch processing or background tasks). The selection of the next task is often based on when the task was generated and/or received by the task queue. For example, many task queues are managed as first-in-first-out queues and the next task to be scheduled is the one that has waited longest in the task queue.

Using a first-in-first-out approach to managing a task queue can be problematic in certain cases. For example, if a data set upon which tasks are performed is partitioned by a key and a very large number of tasks are produced and stored in the task queue for a particular key, then tasks for other keys may have to wait for long periods of time when a scheduler only schedules the tasks based on the time they are generated and/or stored in the task queue. This may occur if the data set includes the data of a number of merchants or customers and if a very large number of tasks are produced all at once and stored in a task queue for a particular customer (i.e., a particular key). In this case, tasks associated with other customers (i.e., other keys) must wait for execution until all the tasks for the particular merchant are completed when the job scheduler only schedules jobs based on when the tasks arrive at the task queue. If the number of tasks for a particular key that arrives at one time are in the hundreds, thousands, or millions, their execution may cause an unfair delay in execution of the tasks of other keys because the tasks of a particular key is dominating use of the execution resources. In other words, certain customers for which there is a large number of tasks may prevent or delay the execution of tasks for other customers. In the interest of fairness, some believe that the fact that the number of tasks for one customer shouldn't negatively impact the scheduling of tasks for another customer.

SUMMARY

Methods and apparatuses for scheduling tasks with a job scheduler are disclosed. In one embodiment, the method comprises: tracking a number of active tasks for each key of a plurality of keys; writing, by a scheduler, a query to identify a next scheduled task among a plurality of scheduled tasks ordered by time in a task queue, the query having an index that excludes tasks associated with a list of one or more keys of the plurality of keys that have a count of active tasks greater than a first limit associated with each key; querying, by a scheduler, the task queue using the query to identify the next scheduled task among the plurality of scheduled tasks, the next scheduled task being associated with a key not excluded by the query; and executing the next scheduled task.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
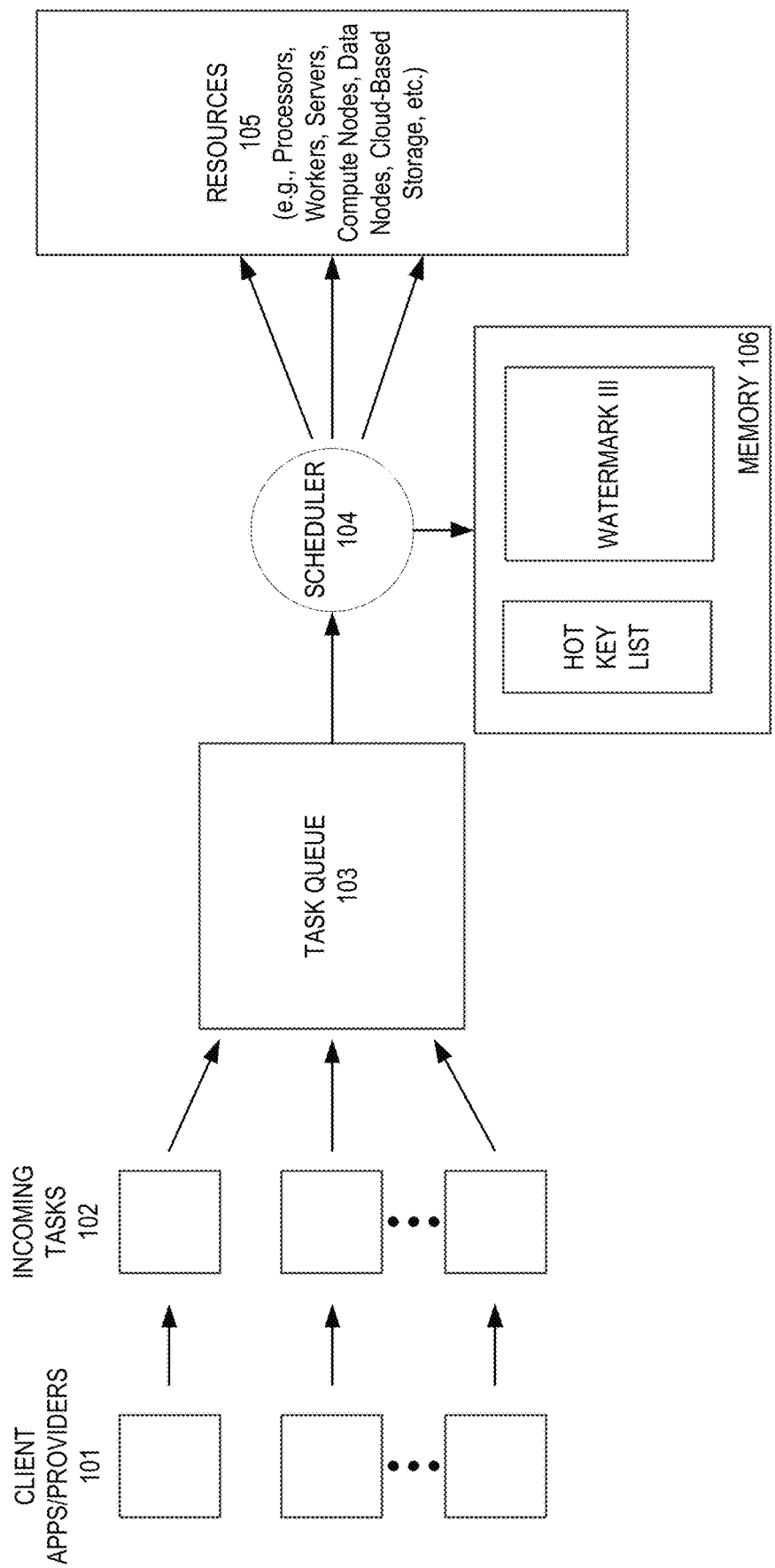
FIG. 1 illustrates a data flow diagram of one embodiment of handling tasks in a task queue.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, to avoid obscuring the present invention.

Techniques are disclosed herein for scheduling tasks with a job scheduler. In one embodiment, the job scheduler selects tasks for execution on a data set from a task queue. The data set is partitioned based on key. In one embodiment, the key is a party, such as, for example, a customer or merchant that is identified by a customer identifier (ID), unique ID, webhook ID, name, etc. The customer or merchant may be one for which payment processing services are performed.

In one embodiment, the scheduling of tasks from the task queue is performed in such a way that the number of active, or in-line, tasks associated with a particular key is controlled so that the tasks for the key do not cause an unfair delay in the performance of tasks associated with other keys. In one embodiment, the number of active tasks associated with a key is limited to a configured limit, referred to herein as a concurrency limit. The limit may be the same for all keys or two or more keys may have different limits (e.g., a per key specific limit). The keys that have a number of active tasks that have exceeded their limit are referred to herein as hot keys, and those keys that have a number of active tasks that haven't exceeded their limit are referred to as cold keys. If the number of active tasks associated with a key has reached its limit during each scheduling cycle, the job scheduler does not select tasks for that key (e.g., a hot key) to be performed. In such a case, the job scheduler may select and execute a task for a key that has not exceeded its limit (e.g., a cold key). This prevents tasks from one or more hot keys from causing unnecessary delays to the tasks of the cold keys which have not saturated their concurrency limits.

In one embodiment, the job scheduler tracks the number active tasks for individual keys and performs scheduling of those tasks based on the number of active tasks a key has. In one embodiment, based on the tracking, the job scheduler determines if the number of active tasks associated with a key has reached their concurrency limit, such that the key is considered a hot key. If so, the job scheduler does not select tasks associated with that key when determining the next task to schedule for execution. In this way, the tasks associated with keys that have not reached their concurrency limit can be scheduled and executed with less delay than if all of the tasks are considered for selection when scheduling the next task for execution.

In one embodiment, the job scheduler tracks the number of active tasks for each key, determines which keys are hot keys and then writes a query to identify the next task to schedule from the task queue that prevents a task associated with a hot key from being selected. After the query has been written, the scheduler uses the query to query the task queue to identify the next task and dispatch that task for execution. In one embodiment, the tasks in the task queue are ordered in time for execution in a task queue, and the index of the query is written to obtain the task that has waited the longest for execution while excluding tasks that are associated with the lists of the hot keys. In this way, a task with a cold key may be selected as the next task for execution among the ordered tasks in the task queue.

FIG. 1 illustrates a data flow diagram of one embodiment of handling tasks of a task queue. Referring to FIG. 1, client applications or other producers 101 generate incoming tasks 102 that are sent and stored in a task queue 103. In one embodiment, task queue 103 comprises a database. Task queue 103 may be a distributed task queue or a distributed database.

Tasks 102 may be associated with all types of actions, including, for example, but not limited to, large batch data export and/or import operations, webhooks in which notifications are generated and sent in response to the occurrence of particular events, or other background work happening (e.g., submissions from a partner/customer with a bunch of charges to process in parallel).

In one embodiment, each of tasks 102 receives a time indication such as, for example, but not limited to, a time stamp when becoming part of task queue 103. In one embodiment, the timestamps are monotonically-increasing and allow tasks 102 to be ordered for execution.

Scheduler 104 schedules tasks that are ordered in task queue 103 for execution using resources 105. In one embodiment, scheduler 104 runs a loop that is running repeatedly to schedule tasks for execution using resources 105. Resources 105 may include one or more processors, workers, computers, compute nodes, etc., that may be used to execute a task in the task queue. These may be part of, or operate on, servers, data nodes, cloud-based storage or a cluster of computers. Note that although only one scheduler is shown, there may be a number of schedulers that supply tasks for execution on data of a number of data sets, database, data nodes, etc.

In one embodiment, scheduler 104 writes a query to select the next task for execution from task queue 103. In one embodiment, the query is written in a way that results in tasks associated with hot keys (or other keys that have reached a configured limit) from being excluded when the query is executed. In one embodiment, when writing a query to query the task queue 103 for the next available task for scheduling execution, scheduler 104 accesses memory 106 to obtain the hot key list 110 that identifies those hot keys that have been determined to have reached their limit (e.g., their concurrency limit) and includes a clause in the query that excludes tasks associated with those keys. Once the query has been created, scheduler 104 performs the query and the next available task for execution is identified. By definition, as those keys that have been determined as hot keys have been excluded from the query, the results of performing the query by scheduler 104 in task queue 103 results in the selection of a task for execution that is from the cold keys.

Figure 2:
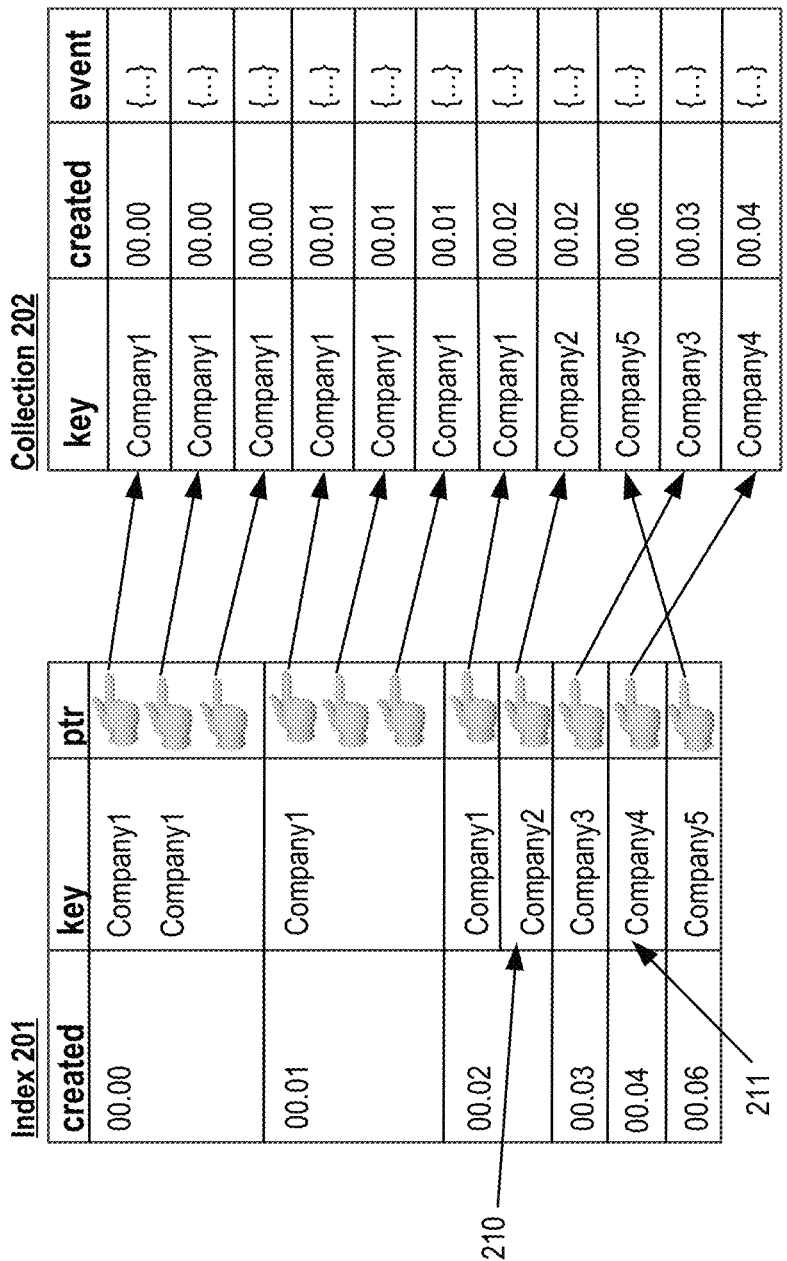
FIG. 2 illustrates one embodiment of a database index and its associated data set collection.

FIG. 2 illustrates a task queue and its index. Referring to FIG. 2, index 201 includes a "created" field, a "key" field and a pointer (ptr) field with a pointer to a record of a task in task queue 202. In the key field, if Company1 is a hot key, then when a scheduler (e.g., scheduler 104 of FIG. 1) writes a query to identify the next task for execution while excluding tasks of the hot key, the tasks of all the entries in index 201 associated with Company1 are not selected, Scheduler 104 keeps track of the number of in-flight tasks for each key and whether that number exceeds a configured limit (i.e., the hot key limit) and stores a list of those keys, hot key list 110, in memory 106. More specifically, in one embodiment, scheduler 104 determines which of the plurality of keys to include in hot key list 110 based on results of the tracking and stores hot key list 110 in memory 106. Thereafter, when writing the query to identify the next task to be scheduled for execution, scheduler 104 accesses hot key list 110 in memory 106 to obtain the keys on hot key list 110 for use in writing the query.

In one embodiment, each key in hot key list 110 has saturated its allowed concurrency and the query to locate is written so that the next scheduled task is associated with a key that has not saturated its allowed concurrency (i.e., a cold key). This is done by amending the query to specifically exclude tasks that have a key on the list of hot keys. That is, the scheduler writes a query that has an index which would result in tasks associated with a list of hot keys on hot key list 110 that have a count of active tasks greater than their configured concurrency limit not being selected for execution. An example query for the database 202 in FIG. 2 that has a composite index to select the oldest task from a set of tasks may be as follows:

```
SELECT event FROM database
ORDER BY created ASC
WHERE key NOT IN ('Company1')
LIMIT 1
``` where Company1 is a hot key to be excluded and "created" specifies that the timestamp of the entry is used to select the task. Note that the query above only specifies one hot key that is to be excluded; however, the clause in the query may be written to exclude multiple hot keys. Also note that writing the query with the keys at the end of the index allows the query to be performed faster, allows the scan to take place closer to the data and avoids transmitting hot keys in between actors.

Once the query is written by scheduler 104, scheduler 104 performs an index scan until the query is satisfied. In the case of the example query above, when scheduler 104 performs the query on index 201, the records associated with Company1 down through record 210 are skipped, resulting in scheduler 104 identifying the record immediately after that point at 00:03.

In one embodiment, the database (or data set) is scaled horizontally. For example, in one embodiment, each database shard has a set of shard keys associated with it. In such a case, a hot key is limited to a single shard. Any shard that doesn't have any data associated with a hot key is able to select tasks for execution in the order for which they are received, which makes scheduling run faster. If schedulers are assigned to shards, the assignment process may take into consideration the number of hot keys associated with each shard.

In one embodiment, the job scheduler determines whether the available resources for task execution are running out and performs hot key throttling when this occurs. For example, in one embodiment, the job scheduler tracks resource usage and availability and when the amount of available resources reaches a particular limit or amount, then the job scheduler creates a query to obtain the next scheduled task for execution that excludes tasks associated with one or more hot keys. In one embodiment, the query excludes tasks for all hot keys on the list. In another embodiment, the query excludes tasks with a subset of the hot keys. For example, the query may exclude only the hottest key (i.e., the key for which the most active tasks exist). Thus, the scheduler is able to control the use of available resources based on hot keys.

Example Data Flow Diagrams

Figure 3:
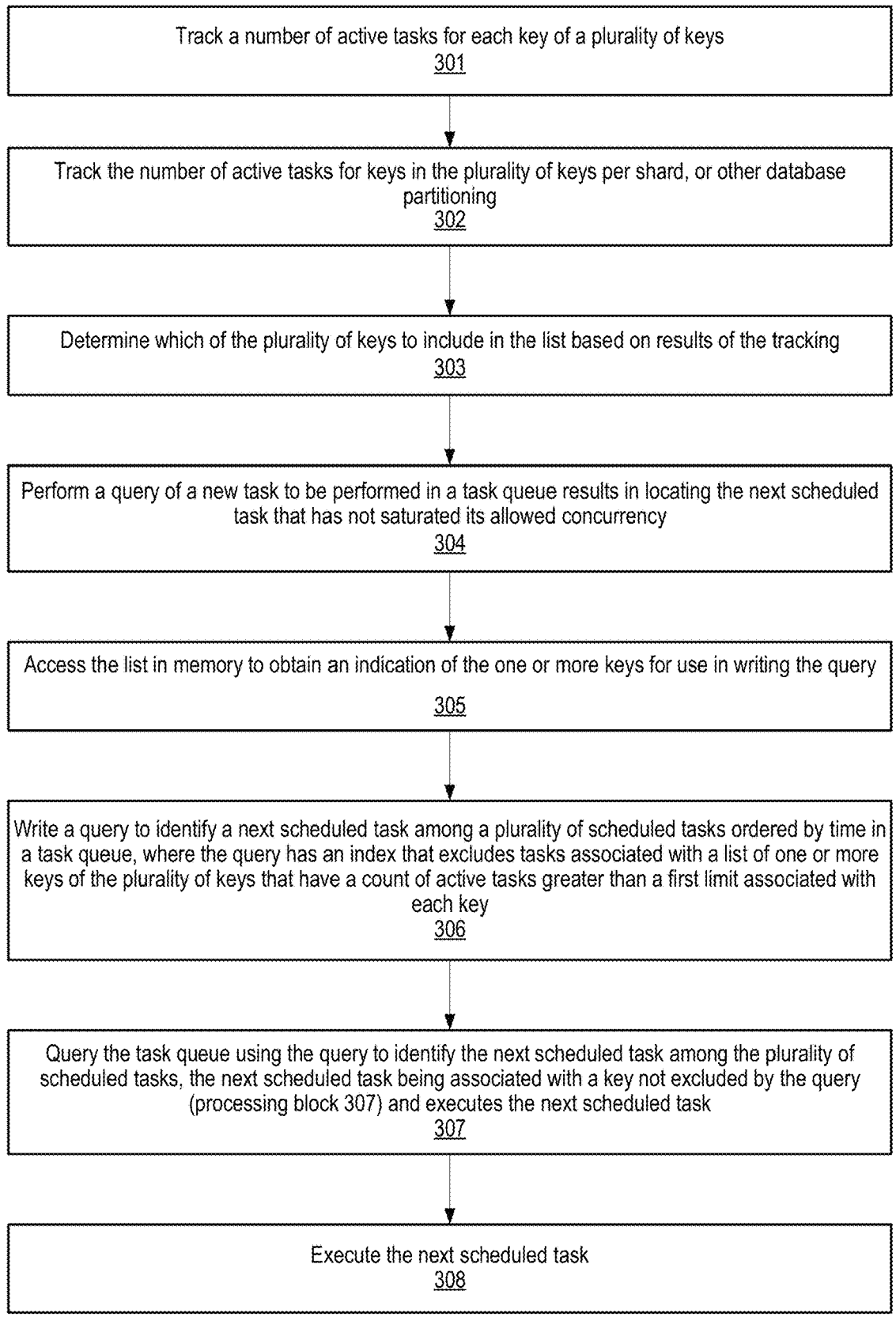
FIG. 3 is a flow diagram of one embodiment of a process for handling tasks.

FIG. 3 is a flow diagram of one embodiment of a process for handling tasks. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In one embodiment, the process is performed by a scheduler, such as, for example, but not limited to, scheduler 104 of FIG. 1.

Referring to FIG. 3, the process begins by processing logic tracking a number of active tasks for each key of a plurality of keys (processing block 301). In one embodiment, each key of the plurality of keys corresponds to a merchant or customer for which payment processing services are being provided.

In some embodiments, processing logic may also track the number of active tasks for keys in the plurality of keys per shard, or other database partitioning (processing block 302).

Based on results of tracking, processing logic determines which of the plurality of keys to include in the list based on results of the tracking (processing block 303). In one embodiment, each key in the list is a key that has saturated its allowed concurrency, such that performing a query of a new task to be performed in a task queue results in locating the next scheduled task that has not saturated its allowed concurrency (i.e., the task is associated with a key that is not in the list). Processing logic stores the list in memory (processing block 304).

When it is time to determine the next task in the task queue to prepare, processing logic access the list in memory to obtain an indication of the one or more keys for use in writing the query (processing block 305) and writes a query to identify a next scheduled task among a plurality of scheduled tasks ordered by time in a task queue, where the query has an index that excludes tasks associated with a list of one or more keys of the plurality of keys that have a count of active tasks greater than a first limit associated with each key (processing block 306). In one embodiment, the limit is different for at least two of the keys of the plurality of keys.

After writing the query, processing logic queries the task queue using the query to identify the next scheduled task among the plurality of scheduled tasks, the next scheduled task being associated with a key not excluded by the query (processing block 307) and executes the next scheduled task (processing block 308).

In one embodiment, the scheduler keeps track of the timestamp associated with the most recently run task and stores this in memory. This timestamp is referred to herein as a cold key watermark. Using this information when performing the next query for the next task to be scheduled allows the scheduler to skip entries in the task queue that it knows are already associated with hot keys. Thus, the scheduler will then use that timestamp to update the query to identify the next task to be scheduled for execution and using the cold key watermark allows the scheduler to skip a number of hot key records in the task queue index (e.g., index 201 of FIG. 2) that would be repeatedly scanned when performing a query of the database because it identifies the location in the task queue where the next task associated with a cold key resides.

In one embodiment, the cold key watermark is part of the query used by the scheduler and causes the scheduler to skip a number of records in the index that are associated with hot keys when scanning the index. In one embodiment, the cold key watermark is stored in memory, such as memory 106 in FIG. 1, and assessed by the job scheduler when creating its query. An example query for the database 202 in FIG. 2 may be as follows:

```
SELECT event FROM database
ORDER BY created ASC
WHERE key NOT IN ('Company1')
AND created >= '00:03' --watermark
LIMIT 1
```

By performing the query above, the scheduler skips the scanning of records in index 201 until it arrives at the record 211 after 00:003 (the record of the last task selected by scheduler 104 for execution, which saves the scheduler time in performing the scheduling. Without the AND statement in the query, all of the Company1 records in index 201 would be scanned by the scheduler when performing the query even though the tasks associated with those records would not possibly satisfy the query because they are associated with hot keys. Thus, the use of the watermark filters out records of index 201 that are known to be associated with hot keys.

Therefore, in one embodiment, the scheduler tracks an indication of a time (e.g., timestamp) of the task most recently returned to the scheduler from the database as a result of querying the database, and writes the next query (and future queries) with a query index that includes the indication of the time of the task most recently returned from the database as a watermark to control where scanning begins within the plurality of scheduled tasks when performing the query.

In one embodiment, if the set of hot key changes, then the watermark is not used in the next query by the scheduler. The set of hot keys may change due to a hot key no longer being considered hot. In this case, the scheduler does not include the watermark as part of the query and runs a full scan as part of the query and thereafter is able to determine the time of the most recently returned task from the database for the given new set of hot keys. This sets the watermark for the next query. Thus, in one embodiment, the scheduler determines that the composition of keys in the hot key list has changed and when performing a new query of the database does not include the watermark of the task most recently returned from the database which caused scanning of the database to begin with the earliest of the plurality of scheduled tasks when performing the query.

In one embodiment, a least recently used (LRU) cache is used to store a mapping of list of hot keys to timestamps in the database index. Alternatively, other memory structures may be used (e.g., another Java structure), including a distributed memory arrangement (e.g., Reddis) may be used for the mapping, particularly if the number of hot keys is large.

Figure 4A:
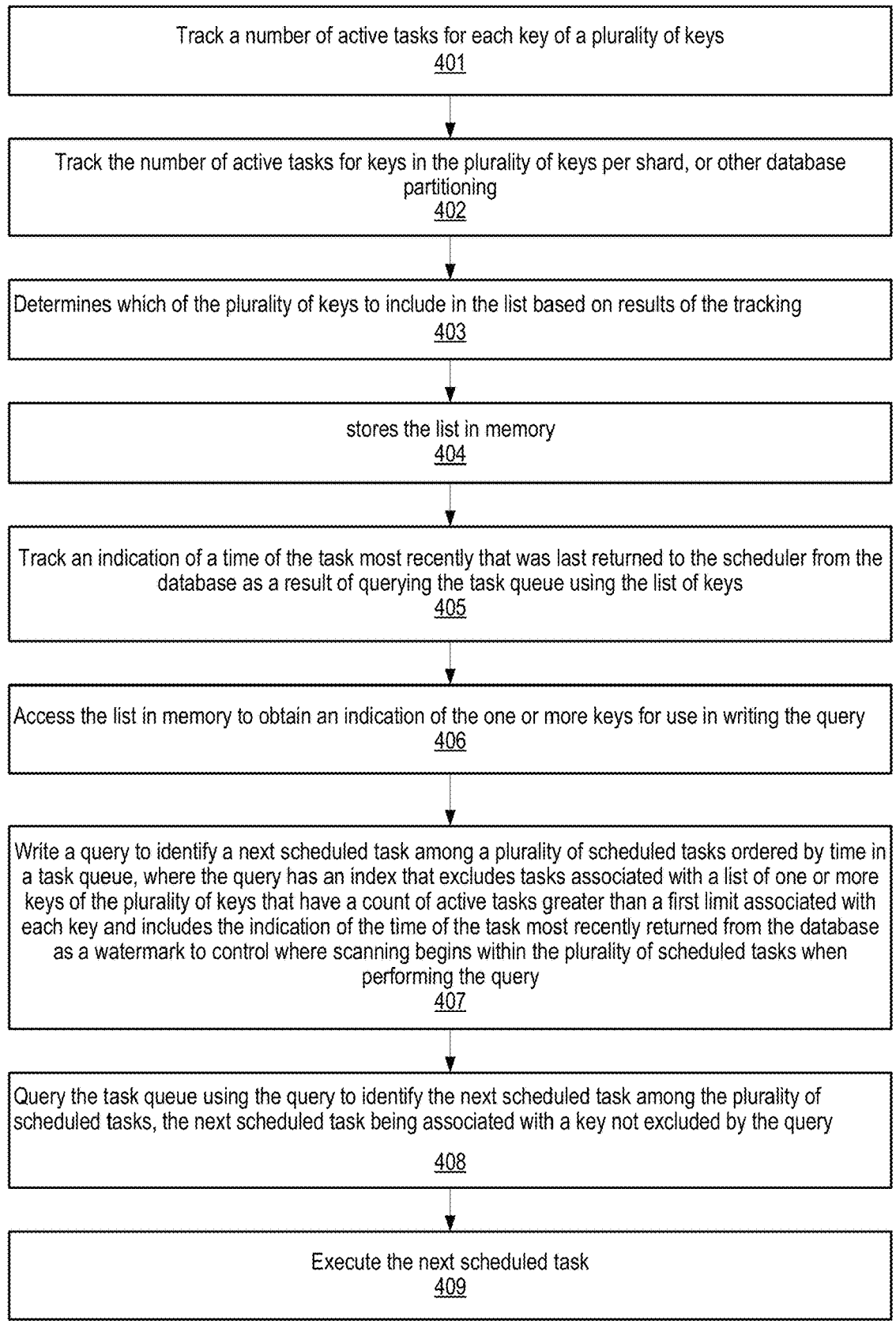
FIG. 4A is a flow diagram of one embodiment of a process for handling tasks for handling tasks using a watermark.

FIG. 4A is a flow diagram of one embodiment of a process for handling tasks for handling tasks using a watermark. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In one embodiment, the process is performed by a scheduler, such as, for example, but not limited to, scheduler 104 of FIG. 1.

Referring to FIG. 4A, the process begins by processing logic tracking a number of active tasks for each key of a plurality of keys (processing block 401). In one embodiment, each key of the plurality of keys corresponds to a merchant or customer for which payment processing services are being provided.

In some embodiments, processing logic may also track the number of active tasks for keys in the plurality of keys per shard, or other database partitioning [any worth mentioning?] (processing block 402).

Based on results of tracking, processing logic determines which of the plurality of keys to include in the list based on results of the tracking (processing block 403). In one embodiment, each key in the list is a key that has saturated its allowed concurrency, such that performing a query of a new task to be performed in a task queue results in locating the next scheduled task that has not saturated its allowed concurrency (i.e., the task is associated with a key that is not in the list). Processing logic stores the list in memory (processing block 404).

In one embodiment, processing logic also tracks an indication of a time of the task most recently that was last returned to the scheduler from the database as a result of querying the task queue using the list of keys (processing block 405). This time indication operates as a watermark from which the scheduler can start to scan the task queue index to locate the next scheduled task in the task queue. In one embodiment, the indication of the time of the task most recently returned from the database comprises its timestamp.

When it is time to determine the next task in the task queue to prepare, processing logic access the list in memory to obtain an indication of the one or more keys for use in writing the query (processing block 406) and writes a query to identify a next scheduled task among a plurality of scheduled tasks ordered by time in a task queue, where the query has an index that excludes tasks associated with a list of one or more keys of the plurality of keys that have a count of active tasks greater than a first limit associated with each key and includes the indication of the time of the task most recently returned from the database as a watermark to control where scanning begins within the plurality of scheduled tasks when performing the query (processing block 407). In one embodiment, the limit is different for at least two of the keys of the plurality of keys.

In one embodiment in which the number of active tasks for keys in the plurality of keys is tracked per shard, the query excludes the one or more of the keys that have a count of active tasks greater than the first limit or greater than a shard limit associated with each key.

After writing the query, processing logic queries the task queue using the query to identify the next scheduled task among the plurality of scheduled tasks, the next scheduled task being associated with a key not excluded by the query (processing block 408) and executes the next scheduled task (processing block 409).

In one embodiment, if the list of hot keys changes, then the watermark is not used and the scanning of the index of the task queue for a new query starts at the beginning of the index. After a new query is performed by the scheduler and the next scheduled task for a non-hot key is identified, then a new watermark may be set. Thus, if the list of hot keys changes, to identify the next scheduled task that is not associated with a hot key, the scheduler performs a new query by scanning the task queue index at its start and using the location in the index of the next scheduled task as the new watermark.

Figure 4B:
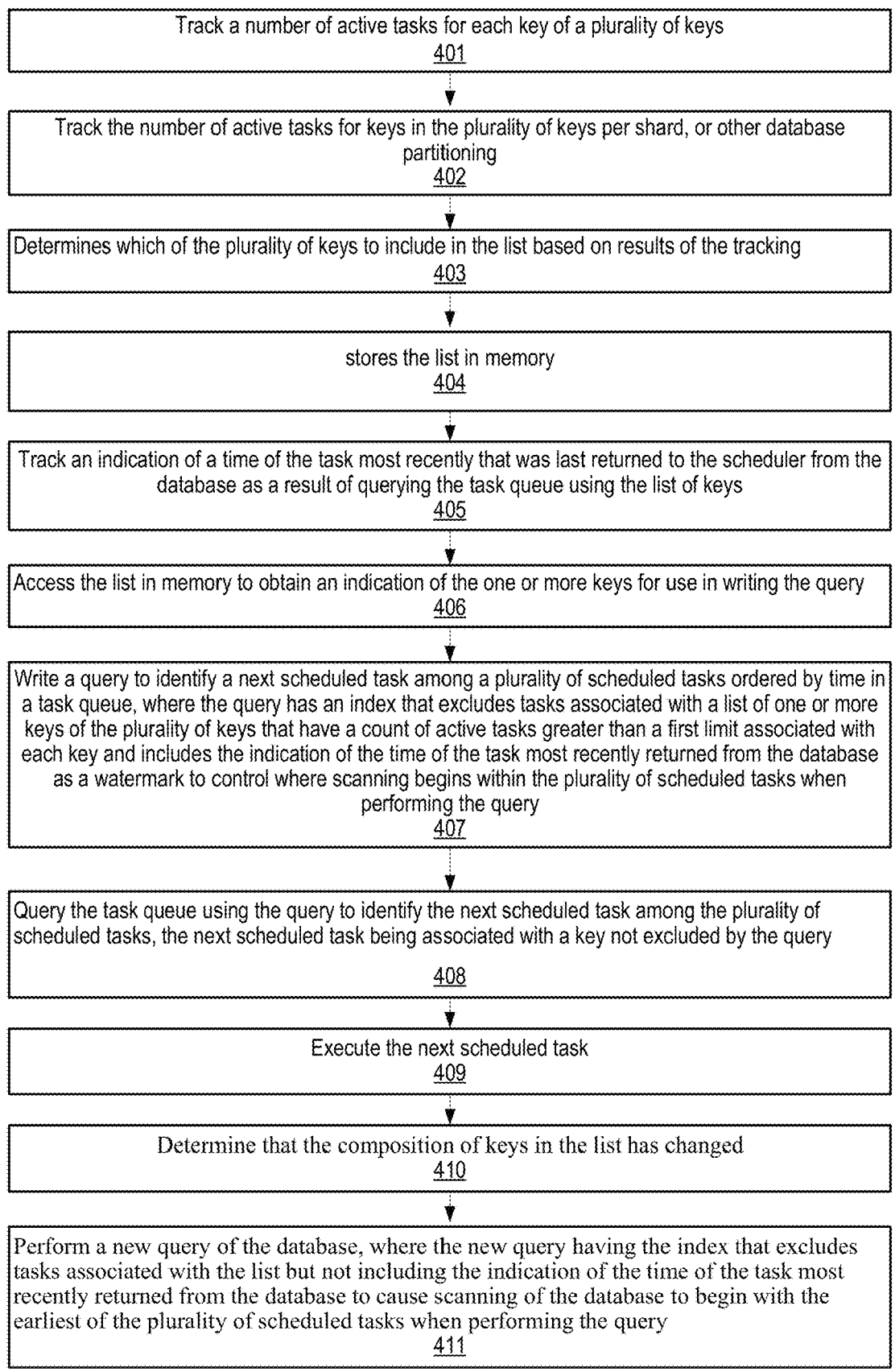
FIG. 4B is a flow diagram of one embodiment of a process for handling tasks using a watermark where the list of hot keys changes.

FIG. 4B is a flow diagram of one embodiment of a process for handling tasks using a watermark where the list of hot keys changes. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In one embodiment, the process is performed by a scheduler, such as, for example, but not limited to, scheduler 104 of FIG. 1.

Referring to FIG. 4B, the process begins by processing logic tracking a number of active tasks for each key of a plurality of keys (processing block 401). In one embodiment, each key of the plurality of keys corresponds to a merchant or customer for which payment processing services are being provided.

In some embodiments, processing logic may also track the number of active tasks for keys in the plurality of keys per shard, or other database partitioning such as described above (processing block 402).

Based on results of tracking, processing logic determines which of the plurality of keys to include in the list based on results of the tracking (processing block 403). In one embodiment, each key in the list is a key that has saturated its allowed concurrency, such that performing a query of a new task to be performed in a task queue results in locating the next scheduled task that has not saturated its allowed concurrency (i.e., the task is associated with a key that is not in the list). Processing logic stores the list in memory (processing block 404).

In one embodiment, processing logic also tracks an indication of a time of the task most recently that was last returned to the scheduler from the database as a result of querying the task queue using the list of keys (processing block 405). This time indication operates as a watermark from which the scheduler can start to scan the task queue index to locate the next scheduled task in the task queue. In one embodiment, the indication of the time of the task most recently returned from the database comprises its timestamp.

When it is time to determine the next task in the task queue to prepare, processing logic access the list in memory to obtain an indication of the one or more keys for use in writing the query (processing block 406) and writes a query to identify a next scheduled task among a plurality of scheduled tasks ordered by time in a task queue, where the query has an index that excludes tasks associated with a list of one or more keys of the plurality of keys that have a count of active tasks greater than a first limit associated with each key and includes the indication of the time of the task most recently returned from the database as a watermark to control where scanning begins within the plurality of scheduled tasks when performing the query (processing block 407). In one embodiment, the limit is different for at least two of the keys of the plurality of keys.

In one embodiment in which the number of active tasks for keys in the plurality of keys is tracked per shard, the query excludes the one or more of the keys that have a count of active tasks greater than the first limit or greater than a shard limit associated with each key.

After writing the query, processing logic queries the task queue using the query to identify the next scheduled task among the plurality of scheduled tasks, the next scheduled task being associated with a key not excluded by the query (processing block 408) and executes the next scheduled task (processing block 409).

Subsequently, in one embodiment, processing logic determines that the composition of keys in the list has changed (processing block 410) and performs a new query of the database, where the new query having the index that excludes tasks associated with the list but not including the indication of the time of the task most recently returned from the database to cause scanning of the database to begin with the earliest of the plurality of scheduled tasks when performing the query (processing block 411).

An Example of Pseudo Code for Hot Key Throttling

The following is an example of pseudo code that depicts part of the process performed by a scheduler that utilizes hot key throttling. In one embodiment, the scheduler uses each query to find the free queue element (FQE) with the earliest consume_at in order to avoid starvation. It does this by querying each database shard by the consumer for unfinished FQEs, sorting by consume_at in ascending order and selecting the first FQE:

```
find(
    query = and(
        eq("finished", 0d),
        in("consumer", consumer),
        lte("consume_at", Time.now),
    ),
    sort = Sorts.ascending(Fields.ConsumeAt),
    limit = 1
)
```

In the presence of one or more shard keys that have saturated their allowed concurrency (hot keys), the scheduler also polls for FQEs that have not saturated their allowed concurrency:

```
find(
    query = and(
        eq("finished", 0d),
        in("consumer", consumer),
        lte("consume_at", Time.now),
        nin("shard_field", [hot_key1, hot_key2, ...])
    ),
    sort = Sorts.ascending(Fields.ConsumeAt),
    limit = 1
)
```

In one embodiment, by including a consume_at >x lower bound in a query, the query performance is improved as the bulk of FQEs with old consume_at values can be skipped as the FQEs are known to be associated with "hot keys".

```
find(
    query = and(
        eq("finished", 0d),
        in("consumer", consumer),
        lte("consume_at", Time.now),
        gte("consume_at", X),
        nin("shard_field", [hot_key1, hot_key2, ...])
    ),
    sort = Sorts.ascending(Fields.ConsumeAt),
    limit = 1
)
```

In one embodiment, a scheduler is assigned to and performs scheduling with respect to one shard in the storage resources. In one embodiment, each scheduler is assigned a shard range to poll for each consumer, and it runs a separate polling loop for each (consumer, shard_range).

Given that each polling loop is isolated to a single (consumer, shard_range), in one embodiment, tracking is performed on the "cold keys" query consume_at minimum watermark within this loop. When the watermark is not known (e.g., on the first iteration), the default is to query the task queue with no lower bound, which is not efficient, and the consume_at from the returned FQE is used to establish the watermark. Then on subsequent queries, the watermark is included to improve the query's performance, updating the watermark on every returned FQE.

```
// Pseudo code in ConsumerFeeder.scala
class ConsumerFeeder (config: FeederConfig) {
    var coldKeyWatermark: Option[Timestamp] = None
    def pollShard(stop: Future[Unit]) (shard: Shard) = {
        if (previousExcludedKeys != excludedKeys) {
            // we can try to optimize here and only reset when keys are removed.
            // or even have a Map of key => watermark, but this complexity
            // seems unwarranted since we would want to reset the watermark
            // periodically anyways (see Issues w/ Mitigations).
            coldKeyWatermark = None
        }
        if (shardKeyRateLimited) {
            val task = findTask(excludedKeys, coldKeyWatermark)
            coldKeyWatermark = Some(task.consumeAt)
        }
    }
}
```

An Example Computer System

Figure 5:
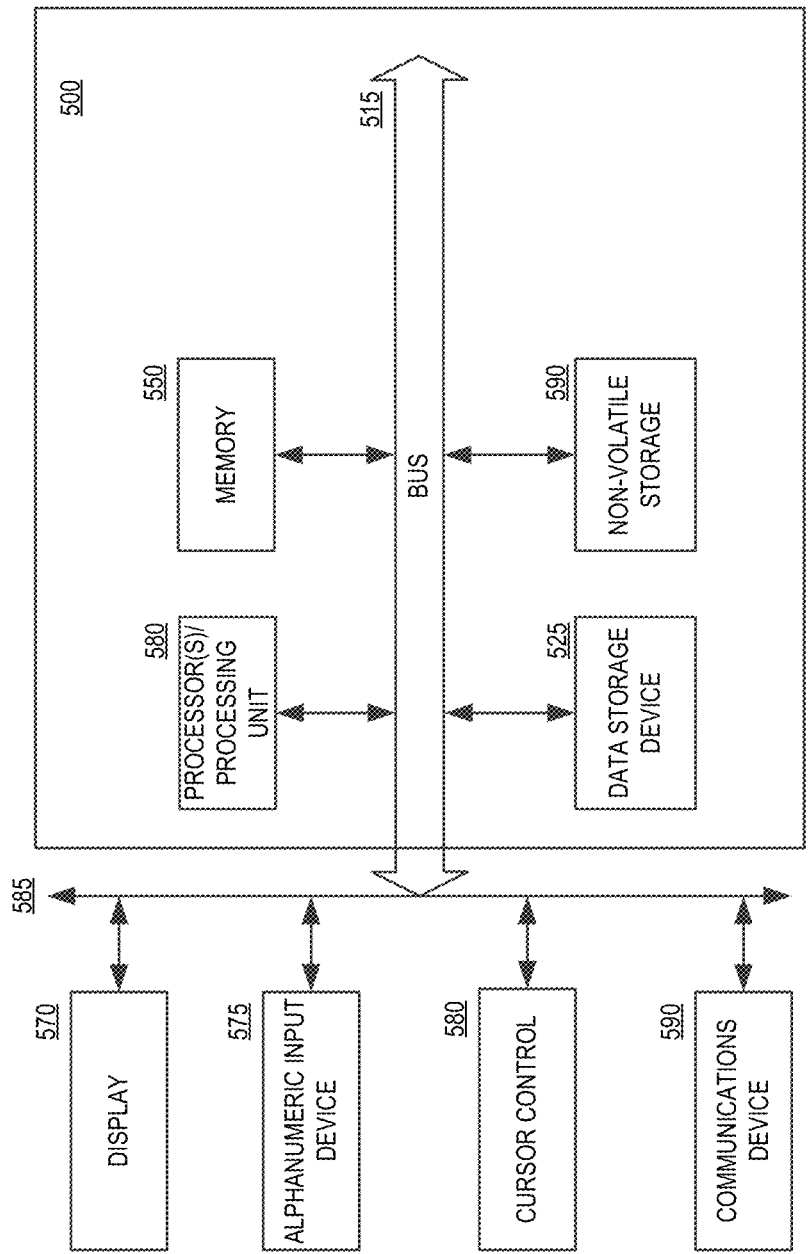
FIG. 5 is one embodiment of a computer system that may be used to support the systems and operations discussed herein.

FIG. 5 is one embodiment of a computer system that may be used to support the systems and operations discussed herein. It will be apparent to those of ordinary skill in the art, however, that other alternative systems of various system architectures may also be used.

The data processing system illustrated in FIG. 5 includes a bus or other internal communication means 515 for communicating information, and a processor(s) 510 coupled to the bus 515 for processing information. The system further comprises a random-access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor(s) 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

In one embodiment, processor(s) 510 executes instructions to perform any of the operations described above including tracking, storage and access of hot keys and watermarks, scheduling, dispatching and executing tasks, and query generation and execution.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 585, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need to be present for the device to function.

There are a number of example embodiments described herein.

Example 1 is a method comprising: tracking a number of active tasks for each key of a plurality of keys; writing, by a scheduler, a query to identify a next scheduled task among a plurality of scheduled tasks ordered by time in a task queue, the query having an index that excludes tasks associated with a list of one or more keys of the plurality of keys that have a count of active tasks greater than a first limit associated with each key; querying, by a scheduler, the task queue using the query to identify the next scheduled task among the plurality of scheduled tasks, the next scheduled task being associated with a key not excluded by the query; and executing the next scheduled task.

Example 2 is the method of example 1 that may optionally include that each key of the plurality of keys corresponds to a merchant.

Example 3 is the method of example 1 that may optionally include that the limit is different for at least two of the keys of the plurality of keys.

Example 4 is the method of example 1 that may optionally include determining which of the plurality of keys to include in the list based on results of the tracking; storing the list in memory; and accessing the list in memory to obtain an indication of the one or more keys for use in writing the query.

Example 5 is the method of example 1 that may optionally include tracking the number of active tasks for keys in the plurality of keys per shard, and wherein the query excludes the one or more of the keys that have a count of active tasks greater than the first limit or greater than a shard limit associated with each key.

Example 6 is the method of example 1 that may optionally include that each key in the group of one or more keys has saturated its allowed concurrency, such that performing the query results in locating the next scheduled task that has not saturated its allowed concurrency.

Example 7 is the method of example 1 that may optionally include tracking an indication of a time of the task most recently returned to the scheduler from the task queue as a result of querying the database, and wherein writing the query comprises including, in the index, the indication of the time of the task most recently returned from the task queue as a watermark to control where scanning begins within the plurality of scheduled tasks when performing the query.

Example 8 is the method of example 7 that may optionally include that the indication of the time of the task most recently returned from the task queue comprises its timestamp.

Example 9 is the method of example 7 that may optionally include determining composition of keys in the list has changed; and performing a new query of the database, where the new query having the index that excludes tasks associated with the list but not including the indication of the time of the task most recently returned from the database to cause scanning of the database to begin with the earliest of the plurality of scheduled tasks when performing the query.

Example 10 is the method of example 7 that may optionally include that the query index includes a plurality of fields, wherein a first field of the plurality of fields comprises the indication of the time of the task most recently returned from the database and a second field of the plurality of fields specifies the list of one or more keys of the plurality of keys, the second field being after the first field in the plurality of fields.

Example 11 is a network arrangement comprising: a database to store a plurality of scheduled tasks ordered by time; and a scheduler communicably coupled to the task queue and having one or more processors to: track a number of active tasks for each key of a plurality of keys, write a query to identify a next scheduled task among the plurality of scheduled tasks ordered by time in the task queue, the query having an index that excludes tasks associated with a list of one or more keys of the plurality of keys that have a count of active tasks greater than a first limit associated with each key, query the task queue using the query to identify the next scheduled task among the plurality of scheduled tasks, the next scheduled task being associated with a key not excluded by the query, and execute the next scheduled task.

Example 12 is the network arrangement of example 11 that may optionally include that each key of the plurality of keys corresponds to a merchant.

Example 13 is the network arrangement of example 11 that may optionally include that the limit is different for at least two of the keys of the plurality of keys.

Example 14 is the network arrangement of example 11 that may optionally include that the one or more processors are configured to: determine which of the plurality of keys to include in the list based on results of the tracking; store the list in memory; and access the list in memory to obtain an indication of the one or more keys for use in writing the query.

Example 15 is the network arrangement of example 11 that may optionally include that the one or more processors are configured to track a timestamp of the task most recently returned to the scheduler from the database as a result of querying the database, and wherein the one or more processors write the query by including, in the index, the timestamp of the task most recently returned from the database as a watermark to control where scanning begins within the plurality of scheduled tasks when performing the query.

Example 16 is the network arrangement of example 15 that may optionally include that the query index includes a plurality of fields, wherein a first field of the plurality of fields specifies the watermark and a second field of the plurality of fields specifies the list of one or more keys of the plurality of keys, the second field being after the first field in the plurality of fields.

Example 17 is the network arrangement of example 15 that may optionally include that the one or more processors are configured to: determine composition of keys in the list has changed; and perform a new query of the database, where the new query having the index that excludes tasks associated with the list but not including the indication of the time of the task most recently returned from the database to cause scanning of the database to begin with the earliest of the plurality of scheduled tasks when performing the query.

Example 18 is one or more non-transitory computer readable storage media having instructions stored thereupon which, when executed by a scheduler having at least a processor and a memory therein, cause the scheduler to perform operations comprising: tracking a number of active tasks for each key of a plurality of keys; writing a query to identify a next scheduled task among a plurality of scheduled tasks ordered by time in a task queue, the query having an index that excludes tasks associated with a list of one or more keys of the plurality of keys that have a count of active tasks greater than a first limit associated with each key; querying the task queue using the query to identify the next scheduled task among the plurality of scheduled tasks, the next scheduled task being associated with a key not excluded by the query; and executing the next scheduled task.

Example 19 is the one or more non-transitory computer readable storage media of example 18 that may optionally include that the limit is different for at least two of the keys of the plurality of keys.

Example 28 is the one or more non-transitory computer readable storage media of example 18 that may optionally include that the operations further comprise: determining which of the plurality of keys to include in the list based on results of the tracking; storing the list in memory; and accessing the list in memory to obtain an indication of the one or more keys for use in writing the query.

Example 21 is the one or more non-transitory computer readable storage media of example 18 that may optionally include that the operations further comprise: tracking a timestamp of the task most recently returned to the scheduler from the database as a result of querying the database, and wherein writing the query comprises including, in the index, the timestamp of the task most recently returned from the database as a watermark to control where scanning begins within the plurality of scheduled tasks when performing the query.

Example 22 is the one or more non-transitory computer readable storage media of example 18 that may optionally include that the query index includes a plurality of fields, wherein a first field of the plurality of fields specifies the watermark and a second field of the plurality of fields specifies the list of one or more keys of the plurality of keys, the second field being after the first field in the plurality of fields.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   tracking, by a scheduler, a number of actively executing tasks associated with each key of a plurality of keys;
   tracking, by the scheduler, an indication of a time that an actively executing task most recently returned to the scheduler for execution from a task queue as a result of previously querying the task queue was returned to the scheduler, wherein the task queue comprises a plurality of scheduled tasks ordered by time;
   writing, by the scheduler, a new query to identify a next scheduled task among the plurality of scheduled tasks, the new query having an index that excludes scheduled tasks associated with a list of one or more keys of the plurality of keys count which are associated with a number of actively executing tasks greater than a first limit associated with each key and includes the indication in the index of the time of the task most recently returned to the scheduler;
   querying, by the scheduler, the task queue using the new query to identify the next scheduled task among the plurality of scheduled tasks, the next scheduled task being associated with a key not excluded by the new query, wherein querying the task queue includes skipping entries in the task queue to begin scanning at a location in the task queue based on the indication in the index of the new query;
   returning, as a result of the new query, the next scheduled task to the scheduler; and
   executing the next scheduled task.

2. The method of claim 1 wherein each key of the plurality of keys corresponds to a merchant.

3. The method of claim 1 wherein the limit is different for at least two of the keys of the plurality of keys.

4. The method of claim 1 further comprising:
   determining which of the plurality of keys to include in the list based on results of the tracking;
   storing the list in memory; and
   accessing the list in memory to obtain an indication of the one or more keys for use in writing the query.

5. The method of claim 1 further comprising tracking the number of active tasks for keys in the plurality of keys per shard, and wherein the query excludes the one or more of the keys that have a count of active tasks greater than the first limit or greater than a shard limit associated with each key.

6. The method of claim 1 wherein each key in the list of one or more keys has saturated its allowed concurrency, such that performing the query results in locating the next scheduled task that has not saturated its allowed concurrency.

7. The method of claim 1 wherein the indication of the time of the task most recently returned from the task queue comprises its timestamp.

8. The method of claim 1 further comprising:
   determining composition of keys in the list has changed; and
   performing a new query of the database, where the new query having the index that excludes tasks associated with the list but not including the indication of the time of the task most recently returned from the database to cause scanning of the database to begin with the earliest of the plurality of scheduled tasks when performing the query.

9. The method of claim 1 wherein the query index includes a plurality of fields, wherein a first field of the plurality of fields comprises the indication of the time of the task most recently returned from the database and a second field of the plurality of fields specifies the list of one or more keys of the plurality of keys, the second field being after the first field in the plurality of fields.

10. A network arrangement comprising:
    a database to store a plurality of scheduled tasks ordered by time; and
    a scheduler having one or more processors to:
    track a number of actively executing tasks associated with each key of a plurality of keys;
    track an indication of a timestamp that an actively executing task most recently returned to the scheduler for execution from the database as a result of previously querying the database was returned to the scheduler;
    write a new query to identify a next scheduled task among the plurality of scheduled tasks, the new query having an index that excludes scheduled tasks associated with a list of one or more keys of the plurality of keys which are associated with a number of actively executing tasks greater than a first limit associated with each key and includes the indication in the index of the timestamp of the task most recently returned to the scheduler;
    query the database using the new query to identify the next scheduled task among the plurality of scheduled tasks, the next scheduled task being associated with a key not excluded by the new query, wherein querying the database includes skipping entries in the database to begin scanning at a location in the database based on the indication in the index of the new query;

return, as a result of the new query, the next scheduled task to the scheduler; and execute the next scheduled task.

11. The network arrangement of claim 10 wherein each key of the plurality of keys corresponds to a merchant.

12. The network arrangement of claim 10 wherein the first limit is different for at least two of the keys of the plurality of keys.

13. The network arrangement of claim 10 wherein the one or more processors are configured to:

determine which of the plurality of keys to include in the list based on results of the tracking;

store the list in memory; and access the list in memory to obtain an indication of the one or more keys for use in writing the query.

14. The network arrangement of claim 10 wherein the query index includes a plurality of fields, wherein a first field of the plurality of fields specifies the watermark and a second field of the plurality of fields specifies the list of one or more keys of the plurality of keys, the second field being after the first field in the plurality of fields.

15. The network arrangement of claim 10 wherein the one or more processors are configured to:

determine composition of keys in the list has changed; and perform a new query of the database, where the new query having the index that excludes tasks associated with the list but not including the indication of the time of the task most recently returned from the database to cause scanning of the database to begin with the earliest of the plurality of scheduled tasks when performing the query.

16. One or more non-transitory computer readable storage media having instructions stored thereupon which, when executed by a scheduler having at least a processor and a memory therein, cause the scheduler to perform operations comprising:

tracking a number of actively executing tasks associated with each key of a plurality of keys;

tracking an indication of a timestamp that an actively executing task most recently returned to the scheduler for execution from a task queue as a result of previously querying the task queue was returned to the scheduler, wherein the task queue comprises a plurality of scheduled tasks ordered by time;

writing a new query to identify a next scheduled task among the plurality of scheduled tasks, the new query having an index that excludes scheduled tasks associated with a list of one or more keys of the plurality of keys which are associated with a number of actively executing tasks greater than a first limit associated with each key and includes the indication in the index of the timestamp of the task most recently returned to the scheduler;

querying the task queue using the new query to identify the next scheduled task among the plurality of scheduled tasks, the next scheduled task being associated with a key not excluded by the new query, wherein querying the task queue includes skipping entries in the task queue to begin scanning at a location in the task queue based on the indication in the index of the new query;

returning, as a result of the new query, the next scheduled task to the scheduler; and executing the next scheduled task.

17. The computer readable storage media of claim 16 wherein the limit is different for at least two of the keys of the plurality of keys.

18. The computer readable storage media of claim 16 wherein the operations further comprise:

determining which of the plurality of keys to include in the list based on results of the tracking;

storing the list in memory; and accessing the list in memory to obtain an indication of the one or more keys for use in writing the query.

19. The method of claim 16 wherein the query index includes a plurality of fields, wherein a first field of the plurality of fields specifies the watermark and a second field of the plurality of fields specifies the list of one or more keys of the plurality of keys, the second field being after the first field in the plurality of fields.

* * * * *